W. F. BILYEU.
DISTRIBUTER FOR SUPPLY WATER TO FEED WATER HEATERS.
APPLICATION FILED OCT. 28, 1913.
1,105,242.
Patented July 28, 1914.
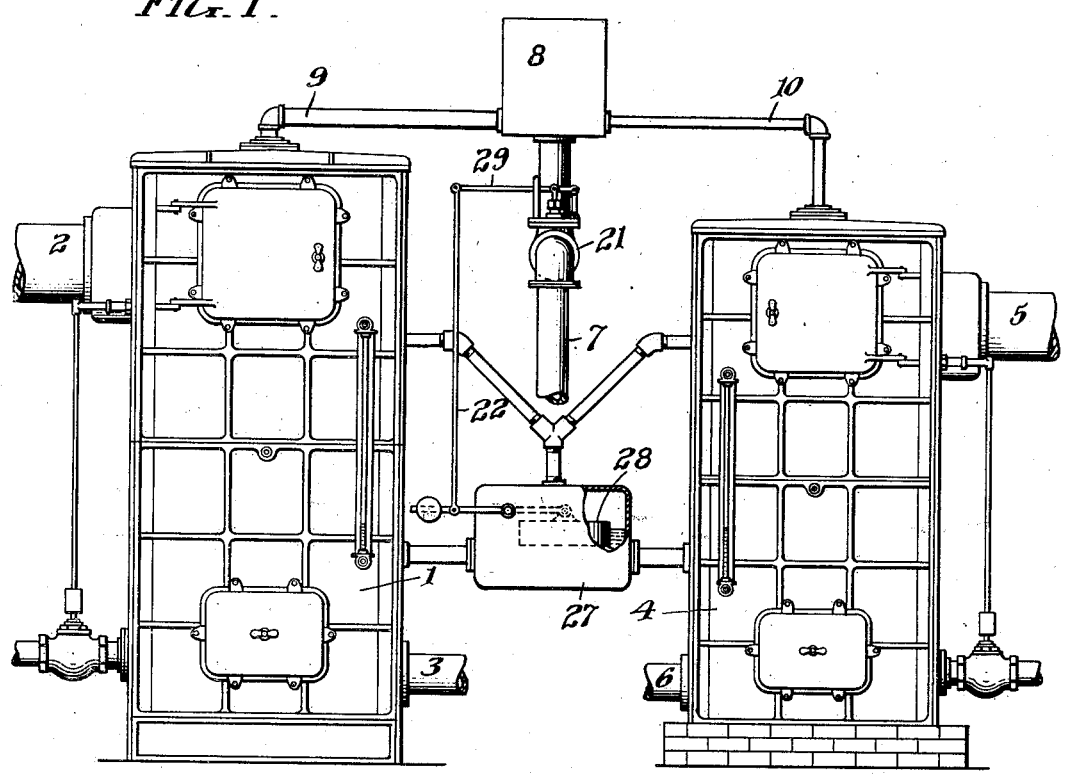
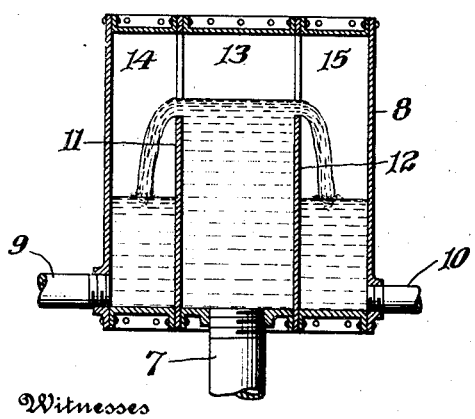
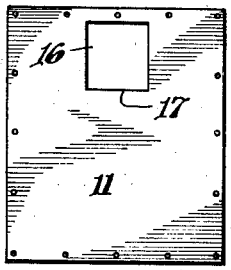
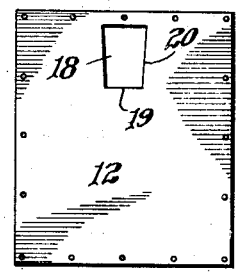
Witnesses
Daniel Webster Jr.
E. W. Smith
Inventor
Wm. F. Bilyeu
By
Attorney

UNITED STATES PATENT OFFICE.

WILLIAM F. BILYEU, OF RIVERTON, NEW JERSEY, ASSIGNOR TO WARREN WEBSTER & COMPANY, A CORPORATION OF NEW JERSEY.

DISTRIBUTER FOR SUPPLY-WATER TO FEED-WATER HEATERS.

1,105,242.  Specification of Letters Patent.  Patented July 28, 1914.

Application filed October 28, 1913.  Serial No. 797,730.

*To all whom it may concern:*

Be it known that I, WILLIAM F. BILYEU, a citizen of the United States, and resident of Riverton, county of Burlington, and State of New Jersey, have invented an Improvement in Distributers for Supply-Water to Feed-Water Heaters, of which the following is a specification.

This invention relates to a distributer for regulating the distribution of the supply of water for a plurality of feed water heaters, and has for its object to provide a mechanism whereby a plurality of feed water heaters of different capacities may effectively operate as a common unit, receive water from a common source of supply and each receive a supply of water proportionate to its capacity, said supply for any heater not being affected or varied by varying conditions in another heater of the same system.

My invention consists of a water distributing device, serving as a common receptacle for feed water, and embodying a novel system of weirs, each of which bears a definite ratio or proportion to the capacity of the feed water heater, the supply of water to which it controls.

It further consists of a common distributing receptacle for the feed water heaters having a separate means therein for regulating the normal supply of water to each feed water heater which it supplies, said means providing at all times the same head of water in respect to each of the feed water heaters.

It further consists of other novel features of construction, all as will be hereinafter fully set forth.

For the purpose of illustrating by invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Referring to the drawings:—Figure 1 represents a side elevation of a pair of feed water heaters of different capacities, equipped with a common water distribution system embodying my invention; Fig. 2 represents a sectional elevation of the water distributing box; Fig. 3 represents a side elevation of one of the weir plates; Fig. 4 represents a side elevation of the second weir plate; and Fig. 5 represents a sectional detail of a modified form of weir construction.

In the drawings, like numerals of reference indicate corresponding parts in the various figures.

1 designates a feed water heater of any suitable type into which the exhaust steam from an engine or other source is conducted by way of the inlet pipe 2, said heater provided with a pump outlet 3 for the combined water of condensation and pre-heated feed water. Adjacent to the feed water heater 1 there is a second feed water heater 4, having a different capacity from that of the feed water heater 1, but which may be identical in other respects, and having the inlet 5 for the exhaust steam and pump outlet 6, as will be readily understood. These two feed water heaters are utilized to supply a boiler or battery of boilers with pre-heated feed water.

In steam plants it sometimes becomes necessary with a battery of boilers to utilize, in connection with a feed water heater of large capacity, a second feed water heater of relatively smaller capacity, the two heaters being necessary in order to take care of the demand of the boilers for pre-heated feed water; that is to say, one large feed water heater is often insufficient to supply all of the feed water necessary, and therefore the additional feed water is furnished by a smaller feed water heater having the required capacity. Changes in the power of steam plants frequently require changes in the capacity of the feed water heaters, and this is accomplished by providing the additional feed water heater or heaters.

In carrying my invention into practice I am enabled to utilize a common pumping element or source of supply for supplying the feed water to the respective feed water heaters, and as here shown, the pipe 7 represents the discharge from the pumping element, and it is connected with what I term a distributing chamber or box 8 which is connected with the respective heaters 1 and 4 by the pipes 9 and 10. In connection with the pipes 9 and 10, it will be noted that the former, which leads to the heater of large capacity, is of larger diameter than the latter which conveys the water to the heater of lower capacity, the two pipes being so proportioned that the flow of water is not only proportionate to the capacities of the heaters, but also bear a direct relation to the supply pipe 7, the cross sectional area of which is preferably equal to or greater than the combined cross sectional areas of the pipes 9 and 10.

The distributing box 8 is sub-divided by plates 11 and 12 into the receiving compartment 13 and the supply or feeding compartments 14 and 15. The receiving compartment 13 is in communication with the supply pipe 7, while the supply compartments 14 and 15 are respectively in communication with the pipes 9 and 10 leading to the heaters. The plate 11 is provided with a weir opening 16, which forms a communication between the chambers 13 and 14 and has a weir crest 17, the length of which is proportioned with respect to the capacity of the feed water heater 1, so that under all normal conditions the water flowing over the weir crest 17 will be sufficient to maintain the feed water heater operating under normal condition. The plate 12 is likewise provided with a smaller weir opening 18 which forms a communication between the chambers 13 and 15; but since the chamber 15 supplies water to the heater 4 of less capacity, the length of the weir crest 19 is less than the crest 17 and bears a definite ratio to the capacity of the feed water heater which it controls. It will further be noted that the sides 20 of the weir 18 are preferably upwardly diverging so that in case the weir head in the chamber 13 is materially increased the ratio of the flow through the two weirs will remain substantially constant, since the diverging construction of the smaller weir will take care of the relatively increased frictional and other losses due to its relatively narrower width. An essential feature of the foregoing construction resides in positioning the two weir crests 17 and 19 at the same distance from the bottom of the chamber 13 so that the flow of water will be at all times under the same head, and it will therefore be apparent that the ratio of flow through the two weirs will be a substantially constant quantity.

27 is an equalizing box in communication with both heaters and has its water level the same as that in the heaters.

28 is a float in the box 27 and operates a lever 22. 21 designates a valve located in the pipe 7, which is automatically controlled by a rod 29 connecting with the lever 22 operated by the float mechanism 28, which is positioned, as above stated, at the normal water level point in the feed water heaters and designed to normally hold the valve 21 in open position, but close the same in case the water in the feed water heaters exceeds the level normally desired. The valve 21 may be operated in any other suitable manner, so long as it accomplishes the same general purpose.

In Fig. 5 I have shown a modified weir construction wherein a weir opening 23 is provided in a plate 24 which is adapted to be removably secured to a plate or plates 25 serving as a substitute construction for the plates 11 and 12, it being understood that the plate 25 has an opening 26 therein to aline with the weir opening 23, so that the flow may take place in the desired manner. In this modified form there will, of course, be a plate 25 to take the place of each of the plates 11 and 12 shown in Fig. 2. By this construction it is possible to adjust or vary the weir openings for heaters of different capacities, thereby making it unnecessary to interchange or substitute a new distributing box for every change in the feed water heater capacities. Thus, any distributing box will serve for all feed water heaters, the only change necessary being to insert the proper weir opening plate 24.

In the operation of the device, the supply of water from the common pumping element or source of supply enters the chamber 13 and there overflows through the respective weirs 16 and 18 into the chambers 14 and 15, the former of which maintains the proper supply of water for the capacity of the heater 1, while the latter supplies the proper amount of water for the heater 4. It will therefore be evident that as each heater is drawn upon at a certain rate, it can have no effect upon, nor disturb in any manner, the required capacity supply for the companion heater, this of course being due to the fact that the weir heads are the same and each discharges into a separate supply or reservoir chamber. Thus it will be seen, there will be no change in the proportionate water supply to the two heaters, and each will perform its correct function irrespective of changed conditions in the other.

It will now be apparent that I have devised a novel and useful construction which embodies the features of advantage enumerated as desirable in the statement of the invention and the above description, and while I have in the present instance shown and described the preferred embodiment thereof, it is to be understood that the same is susceptible of modification in various particulars without departing from the spirit or scope of the invention or sacrificing any of its advantages.

Having now described my invention, what I claim as new and desire to secure by Letters Patent is:—

1. In a device of the character stated, a casing having an inlet and a plurality of outlets, said outlets being respectively adapted for connection with separate feed water heaters of different capacity, a plurality of division partitions in said casing forming an inlet chamber having communication with said inlet, and a plurality of supply chambers having communication respectively with said outlets, each of said partitions being provided with a weir, and all of said weirs being located at the same level, said partitions being constructed to entirely prevent flow of water from one chamber to another below said weirs, and said weirs having crest lengths respectively proportionate to the capacities of the feed water heaters with which the outlets have communication.

2. In a device of the character stated, a casing having an inlet and a plurality of outlets, said outlets being respectively adapted for connection with separate feed water heaters of different capacity, a plurality of removable division plates in said casing forming an inlet chamber having communication with said inlet and a plurality of supply chambers having communication respectively with said outlets, each of said plates having a weir therein at the same distance from the bottom of the plate, said plates being adapted to entirely prevent communication between said chambers below said weirs, said weirs having crest lengths respectively proportionate to the capacities of said feed water heaters, and said crest lengths being substantially constant irrespective of the head of supply water.

In testimony of which invention, I hereunto set my hand.

WILLIAM F. BILYEU.

Witnesses:
R. M. HUNTER,
HORACE D. REEVE.